United States Patent [19]

Kemerer

[11] 3,750,116

[45] July 31, 1973

[54] HALF GOOD CHIP WITH LOW POWER DISSIPATION

[75] Inventor: Douglas Wayne Kemerer, Essex Junction, Vt.

[73] Assignee: International Business Machines Corporation, Armonk, N.Y.

[22] Filed: June 30, 1972

[21] Appl. No.: 267,827

[52] U.S. Cl....... 340/173 BB, 340/172.5, 340/173 R
[51] Int. Cl............................................... G11c 11/34
[58] Field of Search...................... 340/173 R, 172.5

[56] References Cited

UNITED STATES PATENTS

| | | | |
|---|---|---|---|
| 3,402,398 | 9/1968 | Koerner | 340/173 AM |
| 3,422,402 | 1/1969 | Sakalay | 340/173 BB |
| 3,588,830 | 6/1971 | Duda | 340/173 BB |
| 3,659,275 | 4/1972 | Marshall | 340/173 BB |
| 3,688,280 | 8/1972 | Ayling | 340/173 R |

*Primary Examiner*—Terrell W. Fears
*Attorney*—W. N. Barret, Jr., E. S. Gershuny et al.

[57] ABSTRACT

A memory array chip constructed from field effect transistors (FET) which is particularly suitable for use in systems wherein only a portion of the total memory capacity of a chip is used. The chip contains two or more separate memory arrays, each substantially isolated from the others. If one of the arrays is not to be utilized, power may be removed therefrom.

2 Claims, 3 Drawing Figures

HALF GOOD CHIP WITH LOW POWER DISSIPATION

OTHER PATENTS INCORPORATED HEREIN

The specifications and drawings contained in the following patents, all of which are assigned to International Business Machines Corporation, are hereby incorporated into this application:

- U.S. Pat. No. 3,548,388 for STORAGE CELL WITH A CHARGE TRANSFER LOAD INCLUDING SERIES CONNECTED FETS by G. Y. Sonoda, issued Dec. 15, 1970;
- U.S. Pat. No. 3,560,764 for PULSE-POWERED DATA STORAGE CELL by J. J. McDowell, issued Feb. 2, 1971;
- U.S. Pat. No. 3,564,290 for REGENERATIVE FET SOURCE FOLLOWER by G. Y. Sonoda, issued Feb. 16, 1971;
- U.S. Pat. No. 3,588,846 for STORAGE CELL WITH VARIABLE POWER LEVEL by R. H. Linton et al., issued June 28, 1971;
- U.S. Pat. No. 3,638,204 for SEMICONDUCTIVE CELL FOR A STORAGE HAVING A PLURALITY OF SIMULTANEOUSLY ACCESSIBLE LOCATIONS by E. Kolankowsky, issued Jan. 25, 1972.

Also incorporated herein is LOW POWER MOSFET DECODER by R. R. Simone, IBM Technical Disclosure Bulletin, p. 260, Vol. 13, No. 1, June 1970.

BACKGROUND OF THE INVENTION

The invention relates generally to electronic data processing systems having randomly accessible storages and, more particularly, to storages composed of semiconductive devices.

In recent years, the use of solid-state memories has grown substantially. One problem involved in the production of such memories is that, in the manufacturing process, a significant number of chips are often found to be defective. Discarding these chips would result in greatly increasing the cost of memory production. In U.S. patent application Ser. No. 76,917 filed on Sept. 30, 1970 by W.F. Beausoleil for MONOLITHIC MEMORY UTILIZING DEFECTIVE STORAGE CELLS, there is described a technique for utilizing partially defective chips.

Another problem which must be dealt with in solid-state memories is that of heat due to power dissipation. The problems of heat dissipation might, in some situations, be compounded through the use of a technique such as that described in the above-mentioned application because, in that technique, power is still supplied to chip portions which are not actually used for storage.

SUMMARY OF THE INVENTION

In the invention described herein, a memory chip is made up of two (or more) separate arrays of memory cells. Each array has its own bit decoder and word decoder output as well as its own array select pulse. Each array is also provided with a separate low voltage gating supply so that power may be removed from a defective array. In the preferred embodiment, a single word decoder will suffice for both of the arrays on the chip.

The most significant advantage of this invention is that, when it is used in an environment wherein only a portion of the memory capacity of a chip is utilized, the reduced usage of power substantially lessens heat dissipation. Yet another advantage of the invention is that, depending upon yields resulting from the production line, it furnishes the option of using all of the memory capacity of the chip or only a given portion thereof.

BRIEF DESCRIPTION OF THE DRAWINGS

The foregoing and other objects, features and advantages of the invention will be apparent from the following more particular description of the preferred embodiment of the invention as illustrated in the accompanying drawings.

DETAILED DESCRIPTION

Figure 1:
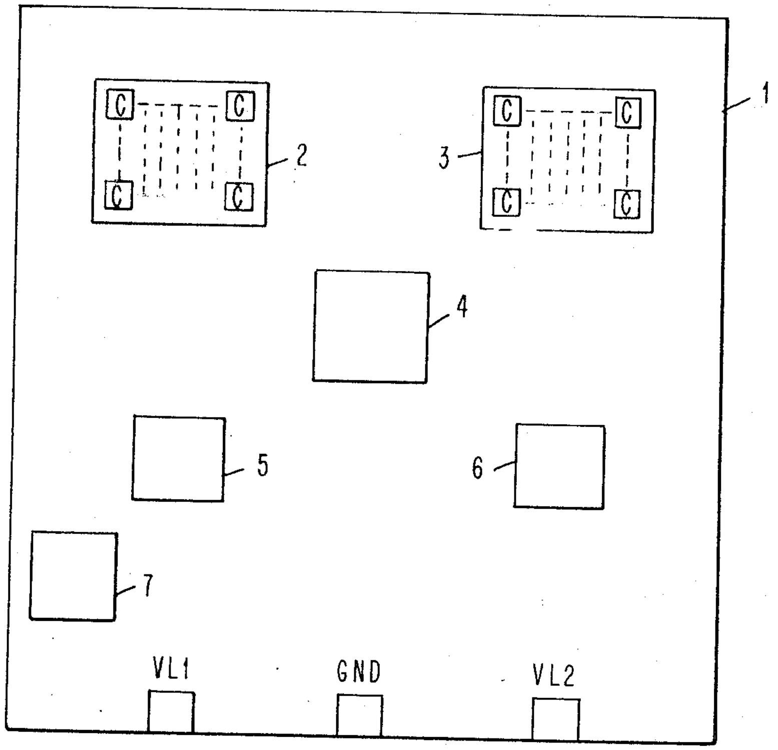
FIG. 1 shows the general layout of a memory chip constructed in accordance with the invention.

Referring to FIG. 1, there is shown a chip 1 which contains two memory arrays 2, 3 each containing memory cells C. In the preferred embodiment of the invention, each memory array contains 512 memory cells. In order to address the arrays, a word decoder 4, two bit decoders 5 and 6, and an array decoder 7 are provided. Addresses will be received from a storage address register SAR (not shown). Also provided on the chip (and shown in FIG. 1 in a stylistic fashion) are an extra ground connection GND and two separate voltage pads VL1 and VL2 for supplying gating voltages to the two arrays 2 and 3.

Details of manufacture of a chip such as that shown in FIG. 1 are well known to those skilled in the art and need not be described herein.

Figure 2:
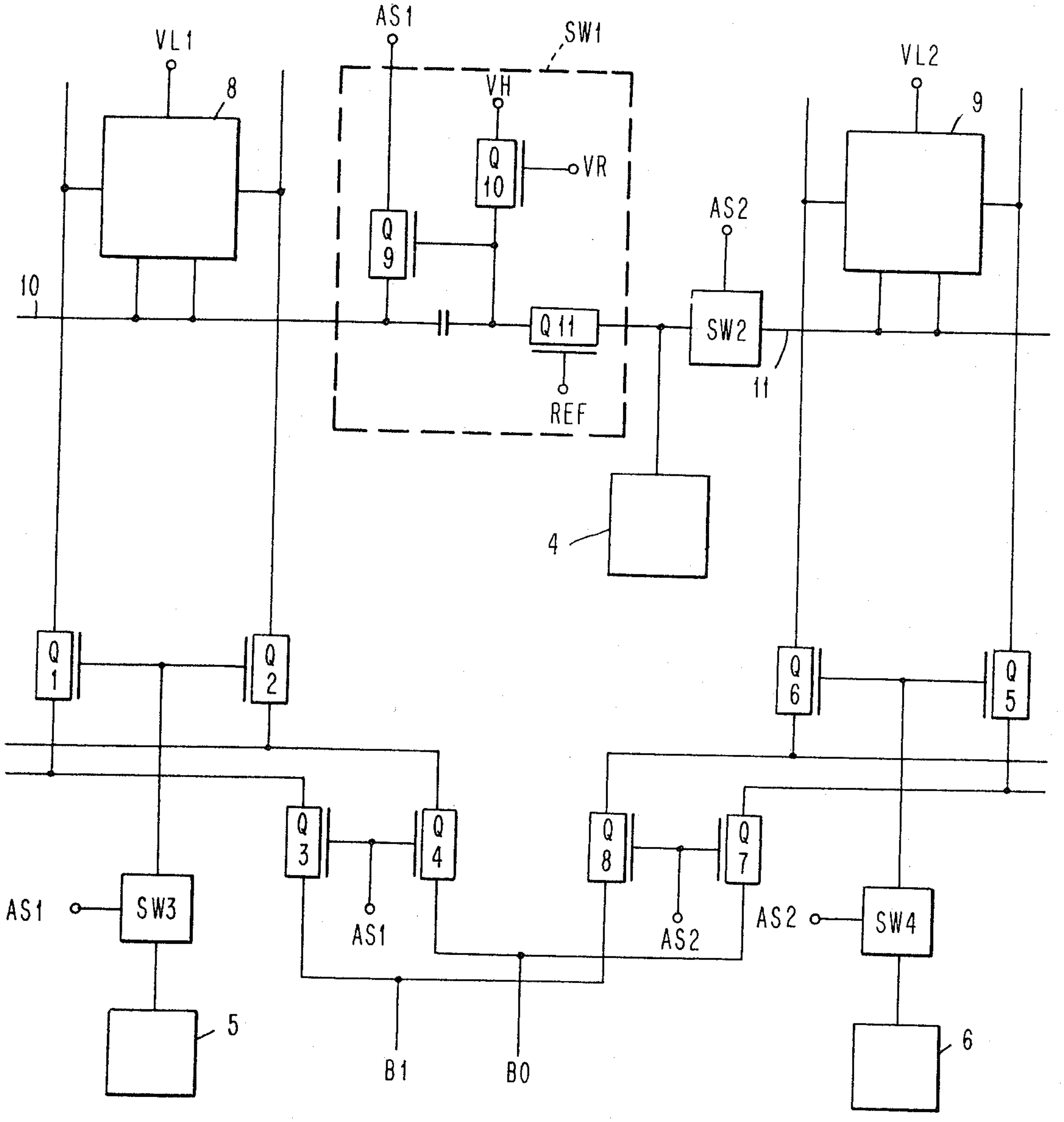
FIG. 2 shows certain additional details of a preferred embodiment of the invention.

Referring now to FIG. 2, additional details of a preferred embodiment of the invention are shown. Instead of depicting the two memory arrays 2 and 3, FIG. 2 depicts a single cell 8 and 9 from each memory array. Cells 8 and 9 are also shown to have respective gating voltages VL1 and VL2 applied thereto. The voltages VL are shown in FIG. 2 in order to emphasize that, with this invention, each of the arrays has a separate gating voltage. (Further details concerning this gating voltage may be found most particularly in U.S. Pat. Nos. 3,588,846 and 3,638,204 both of which show, in FIG. 1, the gating voltage applied to FETs Q3 and Q4.) In addition to elements 4, 5, 6, 8 and 9, FIG. 2 shows several FETs Q and four switches SW, which elements will be further discussed below.

When the first storage array (2, FIG. 1) is to be utilized, array select pulse AS1 will be present (and AS2 will be absent) thereby enabling switches SW1 and SW3. The output of word decoder 4 will pass through SW1 to word line 10 and the output of bit decoder 5 will pass through SW3 to the gates of Q1 and Q2 which comprise a bit switch associated with the first array. AS1 is also furnished to the gates of Q3 and Q4 so that, depending upon what is stored in cell 8, a "zero" bit may be read out on line B0 or a "one" bit may be read out on line B1.

When the second storage array (3, FIG. 1) is to be utilized, array select pulse AS2 will be present (and AS1 will be absent) thereby enabling switches SW2 and SW4. The output of word decoder 4 will pass through SW2 to word line 11 and the output of bit decoder 6 will pass through SW4 to the gates of Q5 and Q6 which comprise a bit switch associated with the second array.

AS2 is also furnished to the gates of Q5 and Q6 so that, depending upon what is stored in cell 9, a "zero" bit may be read out on line B0 or a "one" bit may be read out on line B1.

Since switches SW1, SW2, SW3 and SW4 are preferably constructed in an identical manner, details of only SW1 are shown. The switch comprises three FETS Q9, Q10 and Q11 as shown in FIG. 2.

The primary reason for providing separate gating inputs VL1 and VL2 is to enable disconnection of either of the gating voltages. This may be done by connecting one of the VL inputs to GND instead of connecting it to the VL voltage source.

Figure 3:
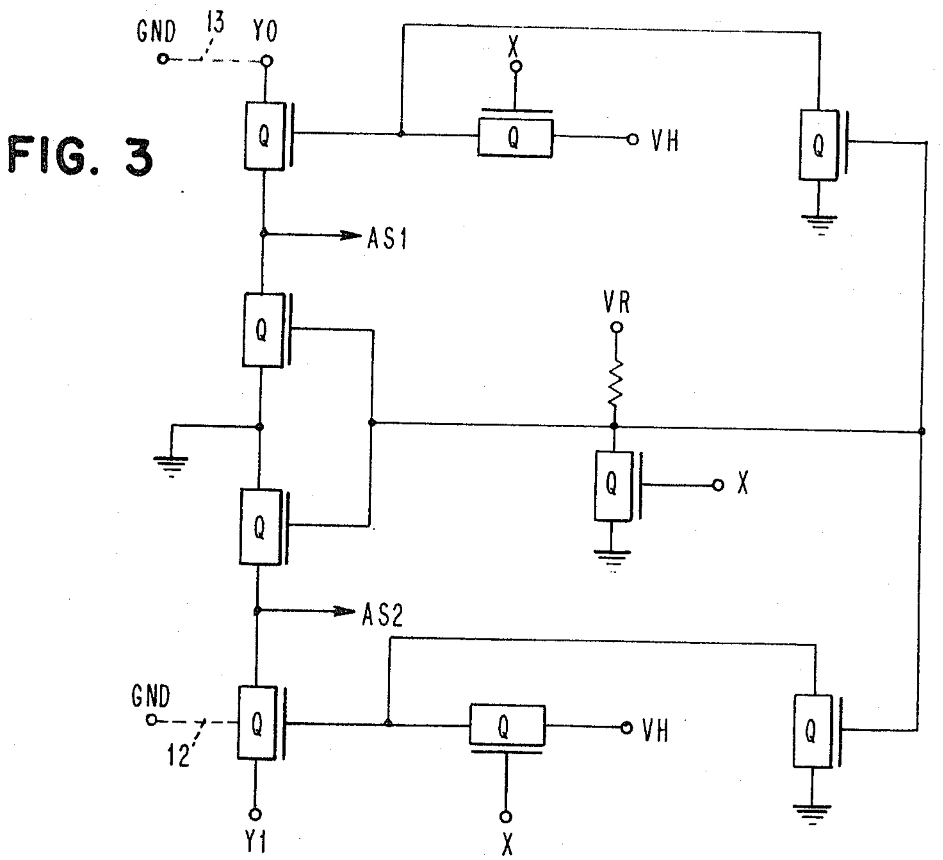
FIG. 3 shows additional details of the array select decoder.

Referring now to FIG. 3, certain details of the array decoder (element 7, FIG. 1) are shown. X is a preselect input while Y0 and Y1 are the select inputs. If only the first array 2 is to be utilized, Y1 will be connected to GND as indicated by broken line 12. The X and Y0 select inputs will then cause array select signal AS1 to select the first array. If only the second array 3 is to be utilized, Y0 will be connected to GND as indicated by broken line 13. The X and Y1 select inputs will then cause array select signal AS2 to select the second array.

One of the advantages of this invention is that, if neither of the arrays on the chip contains any imperfections, the chip can serve as the equivalent of two 512-bit memory chips (or a single 1,024-bit memory chip). In this case, lines 12 and 13 would not be present and the circuitry of FIG. 3 would function as if it were the low-order portion of a standard chip select decoder. Preselect inputs X would be utilized in their normal manner and inputs Y0 and Y1 would represent the low-order bit of a chip address. For example: if the low-order bit of the chip address is a zero (i.e., it is an even address) line Y0 would be raised to generate AS1 and select the first array 2; if the low-order bit of the chip address is a one (odd address) then line Y1 would be raised so that AS2 would select the second array 3.

In addition to the voltage VL which was briefly discussed above, three voltages VH, VR and reference voltage REF are shown in the drawings. Although the specific voltage values utilized in any particular implementation of this invention will vary, and the parameters of such voltages are well known to those skilled in the art, it is noted that in the preferred embodiment VL will generally be approximately 3 to 4 volts, VH will be approximately 8 to 9 volts, VR is a 0 to 8 volt pulse which is the complement of the X preselect input, and REF will be approximately 1 volt below VH.

While the invention has been particularly shown and described with reference to a preferred embodiment thereof, it will be understood by those skilled in the art that various changes in form and details (e.g., more than two arrays per chip could be utilized) may be made therein without departing from the spirit and scope of the invention.

What is claimed is:

1. For use in a monolithic memory:

a chip containing at least one first array of memory cells which will be utilized for storage of information in said memory and at least one second array of memory cells which will not be utilized for storage of information in said memory;

a source of voltage connectable to said first array for controlling the application of power thereto;

addressing means for designating corresponding memory cells in said first and second arrays, said addressing means comprising word decoding means associated with both said first array and said second array, first bit decoding means associated with said first array, and second bit decoding means associated with said second array;

array selection means capable of selecting said first array for causing said address designation to be transmitted to said first array;

first gating means comprising first FET switch means connected between said word decoding means and said first array, and second FET switch means connected between said first bit decoding means and said second array;

and second gating means comprising third FET switch means connected between said word decoding means and said second array, and fourth FET switch means connected between said second bit decoding means and said second array;

all of said switch means being controlled by said array selection means;

whereby, when said chip is used in said monolithic memory, power and address signals may be transmitted to said first array without being transmitted to said second array.

2. The apparatus of claim 1 further including:

third gating means connected between the output of each of said first and second arrays and the output of said monolithic memory;

said third gating means being controlled by said array selection means for causing information to be transmitted between said first array and the output of said monolithic memory while preventing information from being transmitted between said second array and the output of said monolithic memory.

* * * * *